US007114910B2

(12) United States Patent
Stalder

(10) Patent No.: US 7,114,910 B2
(45) Date of Patent: Oct. 3, 2006

(54) METHOD AND INJECTION NOZZLE FOR INTERSPERSING A GAS FLOW WITH LIQUID DROPLETS

(75) Inventor: Jean-Pierre Stalder, Baden (CH)

(73) Assignee: Turbotect Ltd., Baden (CH)

( * ) Notice: Subject to any disclaimer, the term of this patent is extended or adjusted under 35 U.S.C. 154(b) by 44 days.

(21) Appl. No.: 10/490,262

(22) PCT Filed: Nov. 19, 2003

(86) PCT No.: PCT/CH03/00765

§ 371 (c)(1),
(2), (4) Date: Mar. 22, 2004

(87) PCT Pub. No.: WO2004/065020

PCT Pub. Date: Aug. 5, 2004

(65) Prior Publication Data

US 2005/0008474 A1 Jan. 13, 2005

(30) Foreign Application Priority Data

Jan. 24, 2003 (CH) .................................... 104/03
Aug. 26, 2003 (CH) .................................... 1453/03

(51) Int. Cl.
*F01D 1/00* (2006.01)

(52) U.S. Cl. .......................... 415/1; 415/117; 239/422

(58) Field of Classification Search .................... 415/1, 415/116, 117; 239/422, 428, 433; 261/76, 261/78.2, 118
See application file for complete search history.

(56) References Cited

U.S. PATENT DOCUMENTS 4,083,932 A 4/1978 Muraco et al.
5,193,976 A 3/1993 Kolev et al.
5,427,317 A 6/1995 Huttlin
5,452,856 A 9/1995 Pritchard
5,738,281 A 4/1998 Zurecki et al.
6,032,872 A 3/2000 Dupre
6,189,214 B1 * 2/2001 Skeath et al. .......... 29/890.142

FOREIGN PATENT DOCUMENTS

EP 0 248 539 12/1987
WO WO 98 01705 1/1998

* cited by examiner

*Primary Examiner*—Edward K. Look
*Assistant Examiner*—Dwayne J White
(74) *Attorney, Agent, or Firm*—Weingarten, Schurgin, Gagnebin & Lebovici LLP

(57) ABSTRACT

In the method for interspersing a gas flow (8) with fluid droplets (5), the fluid droplets (5) are injected in a fluid injection plane into the gas flow (8), characterised in that an auxiliary gas (6.1, 6.2) is simultaneously injected with the fluid droplets (5) into the gas flow (8). The injection speed of the auxiliary gas (6.1, 6.2) is larger than the injection speed of the fluid droplets (5) so that the injected auxiliary gas (6.1, 6.2) stabilises the injected fluid droplets (5) with respect to trajectory and size, partly shields them from the gas flow (8) and/or entrains them into the gas flow (8). By way of this one achieves an improved control of the spatial distribution of the fluid droplets (5) and their size distribution. The fluid droplets (5) penetrate the gas flow (8) more efficiently than without an auxiliary gas (6.1, 6.2). A preferred use is the online wet-cleaning of a gas turbine compressor.

26 Claims, 5 Drawing Sheets

METHOD AND INJECTION NOZZLE FOR INTERSPERSING A GAS FLOW WITH LIQUID DROPLETS

Figure 1A:
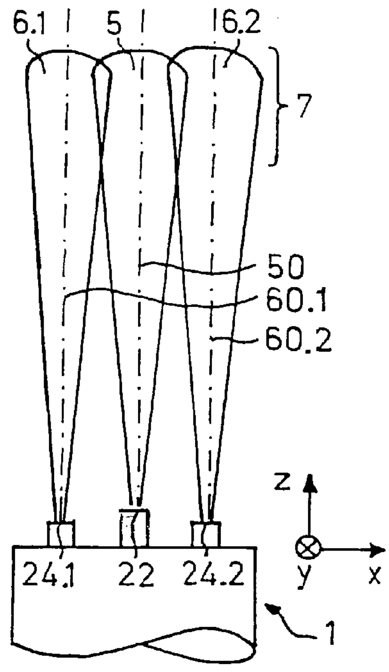

This application is a 371 national phase filing of PCT/CH03/00765 filed Nov. 19, 2003, and claims priority to Swiss application No. 0104/03 filed Jan. 24, 2003 and to Swiss application No. 1453/03 filed Aug. 26, 2003.

The present invention relates to a method for interspersing a gas flow with fluid droplets, according to the preamble of the first patent claim. One of its preferred applications lies in the field of industrial gas turbines where it may be used for wet-cleaning a gas turbine compressor. The invention also relates to an injection nozzle for carrying out the method, according to the preamble of a further independent patent claim. The invention further relates to a turbo-machine, e.g. a gas turbine compressor, according to the preamble of a further independent patent claim.

In this document the invention is explained by way of the application example of wet-cleaning of a gas turbine compressor. The invention may however also be used in other fields of technology, such as e.g. in power station technology and other fields, wherever a gas flow is interspersed with a fluid.

All gas turbines suffer from contamination of the compressor blades. This phenomenon is caused by solid and fluid particles in the intake air which despite filtration of the intake air enter the turbine installation and remain adhered to the compressor blades. Such particles may comprise dust, pollen, insects, oil, sea salt, industrial chemicals, uncombusted hydrocarbons, soot particles, etc. The contamination of the compressor blades leads to losses in the efficiency and power of the whole installation of up to approx. 10% and more. In order to avoid or reduce these losses, one attempts to clean the compressor blades. From the state of the art, various methods and devices for cleaning compressor blades are known.

Traditional cleaning methods are based on soft abrasion by way of rice, nutshells or likewise during operation of the installation. These soft abrasion agents are admixed into the intake air and combusted in the turbine. These simple methods however are not suitable for modern turbines, particularly for those whose compressor blades are provided with protective coatings and whose combustion chamber as well as turbine blade cooling systems are provided with the most modern technology.

For cleaning modern gas turbine compressors three methods are used today:

(i) The manual cleaning method with the installation at a standstill. This method results in an efficient part-cleaning, but in practise may only be carried out within a planned standstill, on inspection or overhaul of the installation. Without opening the compressor cylinder only the first stator row may be cleaned manually, i.e. by hand.

(ii) The off line wet-cleaning method (i.e. cleaning with a starter motor, crank wash, at standstill and with a cooled-down turbine). As a cleaning fluid one uses water, mixtures of water or solvent based compressor cleaners, or such mixtures with an anti-freeze addition. This method is efficient since the complete compressor blading of the rotor as well as the stator and not merely the first stator row may be cleaned. It however has the disadvantage that it needs to be carried out with the turbine at standstill and thus causes losses in production.

(iii) The on line wet-cleaning method (i.e. wet cleaning during operation) with the cleaning fluids as stated under (ii). With this method the compressor blades surface are wetted uniformly and as complete as possible with the cleaning fluid and the dirt particles are released. This cleaning method may be carried out with the gas turbine operating so that no production losses are caused.

The present invention relates to the on line cleaning method (iii).

As of today's state of the art and with the injection nozzles used for on line cleaning, up to now one may differentiate between low-pressure nozzles and high-pressure nozzles. The former operate at a pressure of approx. 3 to 15 bar and produce droplets with diameters of approx. 30 to 1000 μm whilst the latter operate at a pressure of approx. 15 to 90 bar and produces droplet diameters of approx. 3 to 30 μm. Usually one strives for a fine atomisation of the cleaning fluid so that a wetting of the compressor blades as uniform and as surface-covering as possible is performed, in order to ensure their thorough cleaning. The atomisation may also cause a temperature depression of the ingested compressor air by evaporation of the injected fluid mass. Despite this side effect which is desirable per se one strives for as low as possible a mass flow of cleaning fluid in order to avoid or at least reduce further side effects in the compressor (possible erosion) and in the turbine (possible flame-outs) produced by the mass flow of the cleaning fluid including the entrained dirt particles.

According to the common teaching of the state of the art an efficient wetting of the compressor blades is achieved by uniformly distributed droplets. The droplets must be so small that they do not erode the compressor blades and so light so that they are not deflected too much downwards due to the force of gravity and do reach the compressor blades. The design of the injection nozzles is crucial in order to meet the mentioned requirements and thus to ensure an efficient cleaning. This is because the air speed in the air intake duct due to the narrowing of the cross sections is accelerated up to approx. 180 m/s at the entry of the first compressor row. In order to achieve a good droplet distribution in the air flow it is of advantage, according to the power output class of the engine, to provide a larger number (up to approx. 40 and more nozzles) of injection nozzles arranged in the compressor air intake duct.

A method and a device for wet-cleaning a compressor are known from U.S. Pat. No. 5,193,976 (S. Kolev et al.). According to this document a cleaning fluid is injected into the compressor air intake duct by means of one or several injection nozzles. The atomised spray is produced in the form of a cone whose cone angle is approx. 90°. The injection nozzles are atomisation nozzles which are located in an adjustable ball joint and mounted in the compressor air inlet duct wall. This method and these injection nozzles are very suitable for small and medium sized gas turbines of approx. 5 up to 180 MW outputs. Larger gas turbines however have outputs of 180 up to 350 MW and more and thus require correspondingly larger air intake cross sections as well as correspondingly longer compressor blades in particular for the first stator row. For such large high-power output gas turbines the injection nozzles disclosed in U.S. Pat. No. 5,193,976 are no longer performing adequately in order to achieve an efficient and uniform interspersion of the air cross section at the injection plane. The fluid droplets atomised at the nozzles are caught by the intake air flow much too soon, and are deflected from their original trajectory path and carried away. By way of this an efficient interspersion of the whole intake air flow with the fluid droplets becomes very difficult.

From the state of the art there are known nozzles from which simultaneously a liquid and a gas, usually air may be discharged. The discharged air with these so-called two-substance nozzles mostly serves for breaking up or atomising the liquid jet into very small droplets. The publication WO-98/01705 discloses a two-substance nozzle for atomising a fluid. The nozzle is manufactured by way of micro-structuring-layered semiconductor materials. It serves to produce as equal as possible fluid droplets with a small diameter of 10 μm or less. U.S. Pat. No. 6,267,301 (J. Haruch) teaches an enhanced or double atomisation of the fluid. Air is admixed to the fluid in the nozzle pre-chamber in order to achieve a higher discharge velocity and a more efficient atomisation. Furthermore air is discharged at an angle of incidence onto the fluid jet exiting from a fluid discharge orifice, i.e. the air has at least a speed component perpendicular to the fluid jet. By way of this one achieves a fine atomisation as is required for humidification and cooling purposes.

The document EP-0'248'539 discloses a nozzle for atomising a liquid fuel and its admixture with air in a so-called premix burner. In one embodiment form the fuel is discharged from a liquid injection orifice into a first pre-combustion chamber and from there it is discharged into a second pre-combustion chamber. In the second pre-combustion chamber the fuel is swirled with air from a first annular swirl body. The mixture is discharged together with air from a second annular swirl body into the combustion chamber.

There are further known two-substance nozzles having one or more layers of air enveloping or enclosing a liquid jet. Thus e.g. according to U.S. Pat. No. 2,646,314 (D. J Peeps) or U.S. Pat. No. 4,961,536 (J. Y. Correard) an annular layer of air is aligned coaxially and parallel to the fluid jet. U.S. Pat. No. 5,452,856 (J. Pritchard) discloses a nozzle with which a discharged liquid spray may be modified with respect to size and shape by way of simultaneously discharged air. Such nozzles for example are used in spray pistols for atomising varnishes and paints. They are however not suitable for the application for wet-cleaning a large gas turbine compressor where the speed of the intake air at the injection location is approx. 30–80 m/s and up to approx. 180 m/s before the first stator row. These nozzles were designed for the injection of a fluid in standard, atmospheric surrounding conditions. The extremely finely atomised droplets may either not penetrate the boundary layer or are immediately deflected by the airflow resulting in a very poor interspersion of the airflow and thus a poor wetting of the blade surfaces. A large portion of the fluid would thus be pressed by the flow onto the walls of the air intake duct. This portion of the fluid may not be used for the cleaning and may cause erosion problems, mainly on the first compressor rotor blade row.

U.S. Pat. No. 5,738,281 (Z. Zurecki et al.) discloses a gas nozzle with which the discharged gas is shielded from the surroundings by way of an auxiliary gas discharged simultaneously. The auxiliary gas is discharged through a porous medium in a manner such that it forms a cushion enclosing the gas.

To conclude, it may be said that on the one hand the two-substance nozzles known from the state of the art are designed for very different applications and thus are not suitable for interspersing strong, high velocity gas flows with fluid droplets. The known nozzles designed for wet-cleaning gas turbine compressors on the other hand are only wetting adequately the blade surfaces and thus achieving good cleaning results with gas turbines of small and medium power output classes.

It is therefore an object of the invention to specify a method for interspersing a gas flow with fluid droplets according to which the fluid droplets intersperse the gas flow as homogeneously as possible. The fluid droplets in particular should have a controlled size which remains unchanged in the desired bandwidth. It is a further object of the invention to provide an injection nozzle for carrying out the method. The method and the nozzles should be able e.g. to be used for high-power output class turbines where the gas flow has high velocities, large mass flows and large flow cross sections.

The method according to the invention and the injection nozzle according to the invention as are defined in the independent patent claims achieve these objects. A further independent patent claim relates to the example of use of the wet-cleaning of a gas turbine compressor.

In the method according to the invention for interspersing a gas flow with fluid droplets the fluid droplets are injected into the gas flow. An auxiliary gas is injected at the same time into the gas flow. In doing so, the injection speed of the auxiliary gas is larger than the injection speed of the fluid droplets, so that the injected auxiliary gas stabilises the injected fluid droplets with respect to their trajectories and size, partly shields these from the gas flow and/or entrains the fluid droplets or accelerates them into the gas flow. The injection speed of the auxiliary gas may e.g. be at least twice as large, preferably at least five times larger and for example at least ten times larger than the injection speed of the fluid droplets.

The method according to the invention may for example be used for interspersing the intake air flow of a gas turbine compressor with droplets of a cleaning fluid. In the method according to the invention for wet-cleaning a gas turbine compressor which comprises an air intake duct through which ingested air flows, a cleaning fluid in the form of fluid droplets is injected into the air intake duct, and the fluid droplets are carried along to the parts of the gas turbine compressor to be cleaned, in order to clean these. The fluid droplets are injected-into the intake airflow. At the same time the injection speed of the auxiliary gas is larger than the injection speed of the fluid droplets so that the injected auxiliary gas stabilises the injected fluid drops with respect to their trajectory and size, partly shield these from the gas flow and/or entrains them into the gas flow. The injection speed of the auxiliary gas may, e.g., be at least twice as large, preferably at least five times larger and for example at least ten times larger than the injection speed of the fluid droplets.

The injection nozzle according to the invention for carrying out the method according to the invention contains a base surface delimiting the injection nozzle towards the gas flow, a fluid inlet opening and a gas inlet opening, at least one fluid orifice connected to the fluid inlet opening and at least one gas orifice connected to the gas inlet opening. The injection nozzle is designed in a manner such that the at least one fluid orifice is arranged on at least one protuberance projecting out of the base surface into the gas flow. The height of the at least one protuberance beyond the base surface may for example be 2 to 9 mm and preferably 3 to 5 mm.

The injection nozzle according to the invention may for example be used for interspersing the intake airflow of a gas turbine compressor with droplets of a cleaning fluid. The flow machine according to the invention or a gas turbine compressor comprises a flow duct having a housing walling, for example an air intake duct, wherein at least one injection nozzle according to the invention is mounted in the housing walling.

A further embodiment example of the flow machine according to the invention or a gas turbine compressor comprises a flow duct having a housing walling, for example an air intake duct, wherein at least one injection nozzle according to the invention is mounted in the housing walling which comprises a fluid inlet opening and at least one fluid orifice connected to the fluid inlet opening. The injection nozzle further comprises a gas inlet opening and at least one gas orifice connected to the gas inlet opening.

Advantageous embodiments of the methods and of the injection nozzle are defined in the dependent patent claims.

By way of the invention an improved control of the spatial distribution of the fluid droplets into the depth and width of the gas flow cross section and the size distribution of the fluid droplets is achieved. According to the invention the auxiliary gas exerts a stabilising effect, a shielding effect and an entraining and acceleration effect on the discharged fluid droplets. With respect to the state of the art the invention in particular has the following advantages:

The fluid droplets are deflected less and temporally later by the gas flow.

The fluid droplets penetrate more efficiently the gas flow boundary layer along the housing walling The fluid droplets have better controlled trajectories in the gas flow.

The spray angle of the fan in which the fluid droplets are discharged is more stable.

This and other advantageous effects results in that at least a portion of the fluid droplets intersperse the gas flow much more efficiently than without an auxiliary gas.

According to the invention a relatively broad distribution range (e.g. Gauss distribution) of different droplet diameters, for example between 50 and 250 μm is strived for. Fluid droplets of different diameters will have different trajectories and thus penetrate to different extent into the gas flow, resulting in an improved interspersion of the gas flow with the fluid droplets.

In the following, the invention is described in detail by way of the drawings.

Figure 1B:
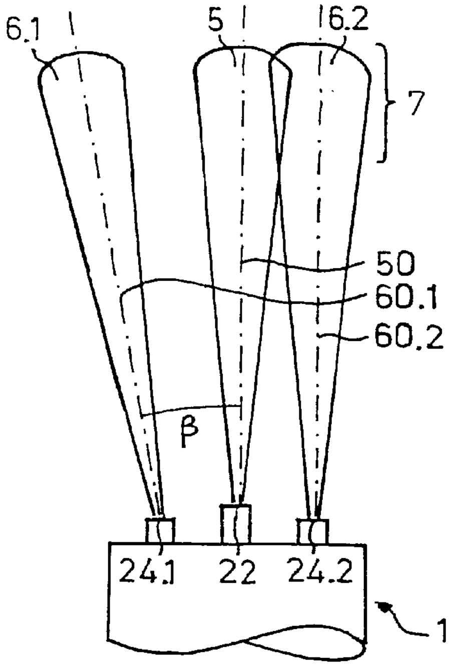
Figure 2:
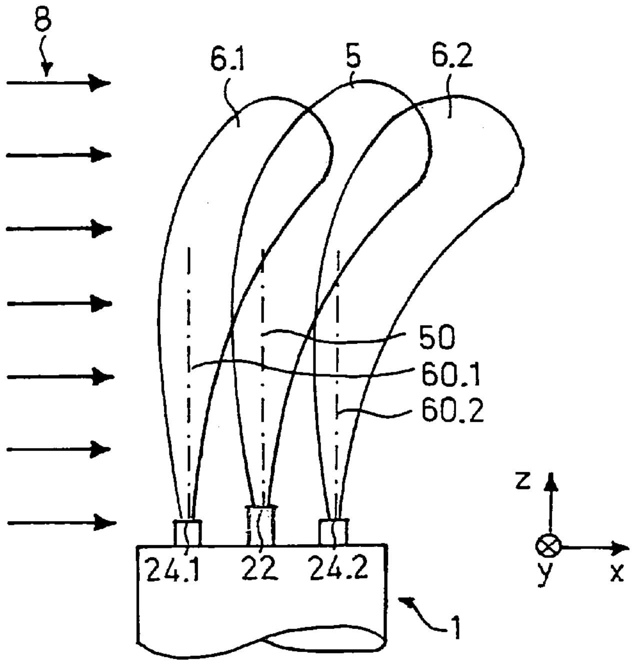
Figure 3:
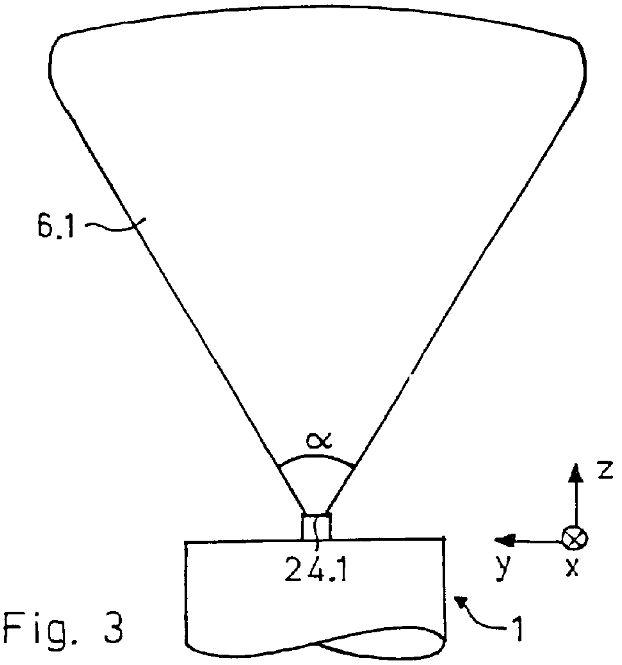

FIGS. 1–3 schematically show the method according to the invention, specifically:

FIG. 1 parts of two embodiment forms (a) and (b) of an injection nozzle according to the invention with the discharged media, shown without the inlet gas flow of the flow-machine e.g. a gas turbine, in a schematic lateral view, FIG. 2 a part of an injection nozzle according to the invention with the discharged media, shown with the inlet gas flow of the flow-machine e.g. a gas turbine, in a schematic lateral view, FIG. 3 a part of an injection nozzle according to the invention with the discharged media in a schematic front elevation, i.e. a view of the injection plane.

Figure 4:
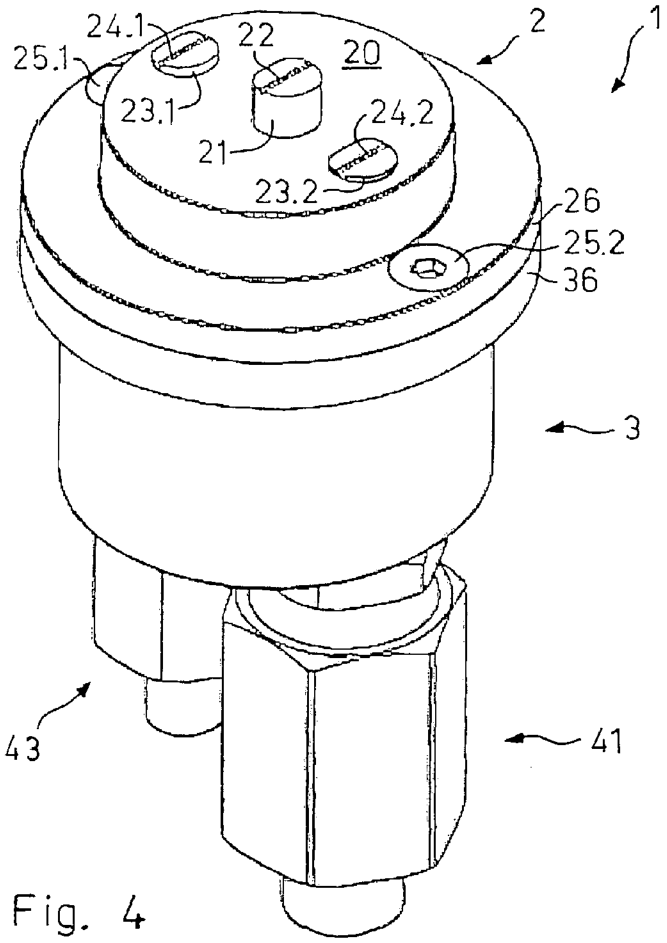
Figure 5:
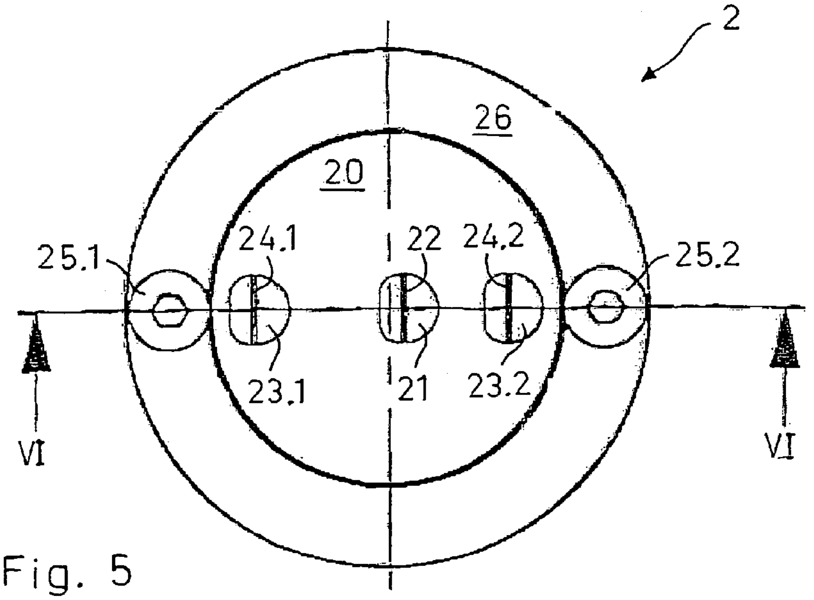
Figure 6:
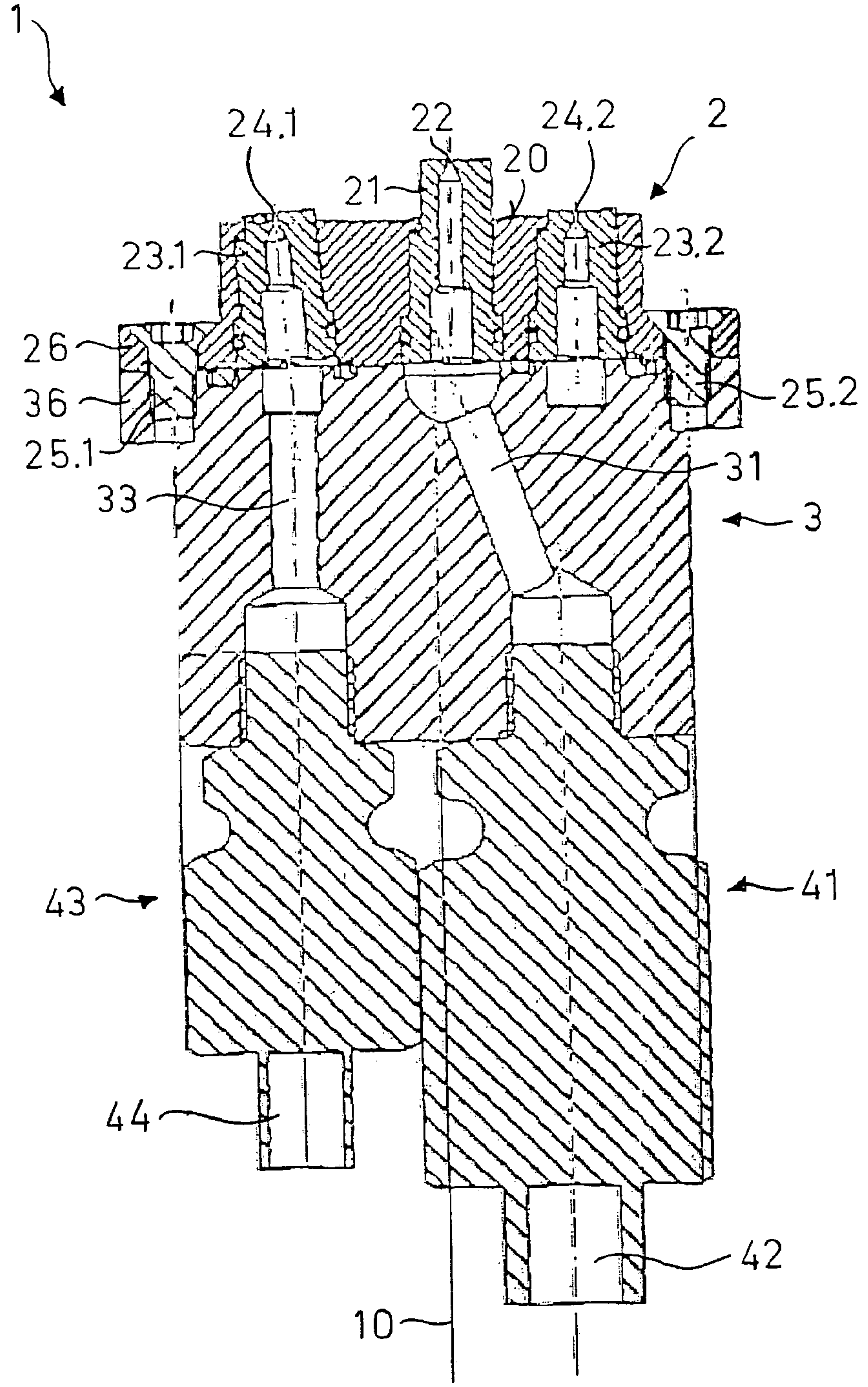
Figure 7A:
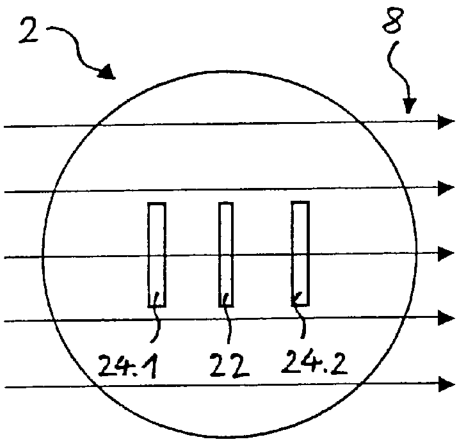
Figure 7B:
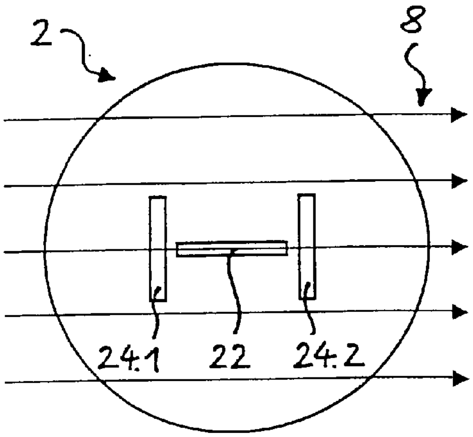
Figure 7C:
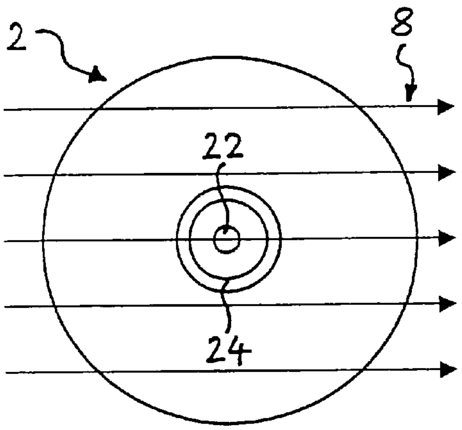
Figure 7D:
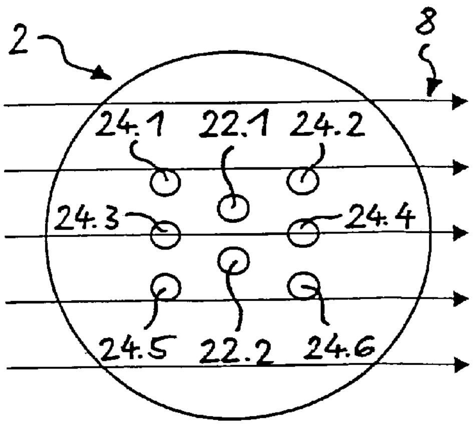

The FIGS. 4–6 show a preferred embodiment form of the injection nozzle according to the invention, specifically FIG. 4 one embodiment form of the injection nozzle according to the invention, in a perspective view, FIG. 5 the injection nozzle of FIG. 4 in a top view and FIG. 6 the injection nozzle of FIGS. 4 and 5 in a longitudinal section, along line IV—IV in FIG. 5.

Figure 8:
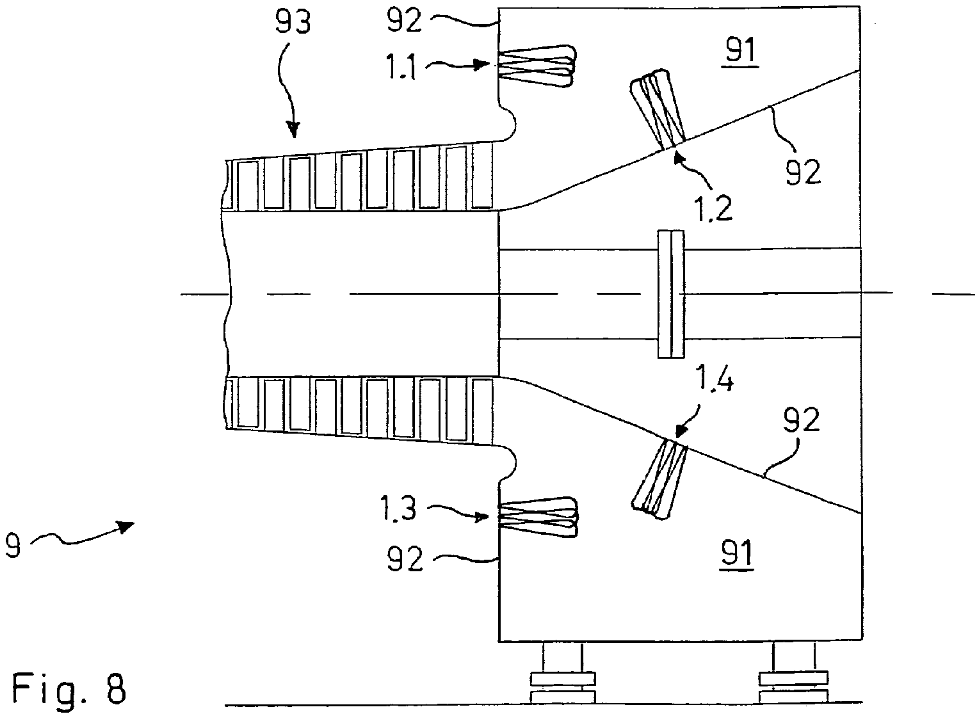

FIG. 7 shows various embodiment forms of the injection nozzle according to the invention, in schematic top views and FIG. 8 finally shows a gas turbine compressor according to the invention in a schematic longitudinal section through the intake part.

In FIG. 1(*a*) the upper part of a first embodiment form of an injection nozzle 1 according to the invention is represented schematically in a lateral view. In this representation and for didactic reasons it is firstly assumed that no gas flow is present. Fluid droplets 5 are discharged from a fluid orifice 22 of the injection nozzle 1, and specifically in a manner such that the fluid droplets 5 are discharged in essentially one plane (yz-plane)—here called the fluid injection plane 50. One may in terms speak of a “plane” here since the extension of the spatial fluid droplet distribution in the x-direction is much smaller than in the y-respectively the z-direction. This fact is not immediately evident from the representation in the FIGS. 1–3, since in these, for the sake of clarity, the length conditions in the three spatial directions are not represented exactly true to scale.

Furthermore an auxiliary gas 6.1, 6.2 is discharged respectively from at least one gas orifice, in the example of FIG. 1 from two gas orifices 24.1, 24.2 of the injection nozzle 1. Each gas orifice 24.1, 24.2 is shaped and arranged with respect to the fluid orifice 22 in such a manner that the auxiliary gas 6.1, 6.2 exits essentially in a gas injection plane 60.1, 60.2. In the example shown here the gas injection plane 60.1, 60.2 lies essentially parallel to the fluid injection plane 50 and is distanced to this. The distance of the fluid injection plane 50 and the gas injection plane 60.1, 60.2 is preferably selected such that the fluid droplets 5 and the auxiliary gas 6.1, 6.2 come into contact with one another in a mixing zone 7 at least after a finite trajectory.

The second embodiment form of an injection nozzle 1 according to the invention shown in FIG. 1(*b*) differs from that of FIG. 1(*a*) in that the first gas orifice 24.1 is designed in a manner such that the auxiliary gas 6.1 is discharged in a plane 60.1 slightly tilted at an angle with respect to the fluid injection plane 50. The tilting angle β is for example approx. 2°–20° preferably approx. 10°. Such a tilting angle may be advantageous for an efficient interspersion of a gas flow, as will be explained further below.

FIG. 2 shows the same injection nozzle 1 in the same view as FIG. 1(*a*), but in the presence of a gas flow 8, schematically indicated with arrows. At the same time it is assumed that the flow direction of the gas flow 8 is the (+x)-direction. The discharged media 5, 6.1, 6.2 interact with one another by way of thrusts and/or frictions on the one hand and with the gas flow 8 on the other hand. By way of the mutual interaction of the media 5, 6.1, 6.2 the media 5, 6.1, 6.2 are accelerated in both directions y and z. By way of the interaction of the media 5, 6.1, 6.2 with the gas flow 8 the media 5, 6.1, 6.2 are accelerated in the x-direction, i.e., are deflected out of the fluid injection plane 50 or out of the gas injection plane 60.1, 60.2. This deflection would occur earlier and to a greater extent if the fluid droplets 5 alone were subjected to the gas flow 8. In this case the fluid droplets 5 would only achieve a small distance (in the z-direction). The auxiliary gas 6.1, 6.2 discharged according to the invention simultaneously with the fluid droplets 5 counteracts this undesired effect however at least from three viewpoints:

Firstly the auxiliary gas 6.1, 6.2 acts on the fluid droplets 5 in a stabilising and controlling manner with regard to their size, the angle a of the spray (cf. FIG. 3) and their trajectories. In contrast to the teaching of the initially mentioned U.S. Pat. No. 6,267,301 thus the auxiliary gas 6 does not modify the initial size of the fluid droplets 5, in particular they are not atomised into smaller parts.

Secondly the auxiliary gas 6.1 discharged from the gas orifice 24.1 situated upstream shields the fluid droplets 5 from the gas flow 8 at least after discharge through the nozzle and on an initial section of the trajectory, in that the particles of the auxiliary gas 6.1 collide with the particles of the gas flow 8 and accelerate these in the (+z)-direction. Thus a penetration of the gas flow boundary layer by the fluid droplets 5 is made easier; after crossing the boundary layer the deflection of the fluid droplets 5 by the gas flow 8 in their trajectories is delayed and by way of this a deeper penetration of the fluid droplets 5 into the gas flow 8 is made possible.

Thirdly the auxiliary gas 6.1, 6.2 exerts an entraining or acceleration effect on the fluid droplets 5 in that it accelerates these in the (+z)-direction. The precondition for this is of course the fact that the discharge velocity of the auxiliary gas 6.1, 6.2 is larger than that of the fluid droplets.

All three effects, the stabilising, shielding and entraining effect result in that at least a share of the fluid droplets 5 travel a further distance in the z-direction than without auxiliary gas 6.1, 6.2 without influencing the initial droplet size.

In FIG. 3 the injection nozzle 1 of the FIG. 1(*a*), 1(*b*) or 2 are represented schematically in a front elevation (in +(x)-direction of the gas flow). The fluid droplets 5 and the auxiliary gas 6.1, 6.2 are preferably injected into the gas flow 8 in the shape of sprays, wherein the spray diverges in the +(z) direction with an increasing distance from the injection nozzle 1. The angle $\alpha$ of the spray is for example approx. 20°–90°, preferably approx. 60°.

The spray angle $\alpha$ for the fluid droplets 5 may be different for the auxiliary gas discharged upstream and/or for the auxiliary gas 6.2 discharged downstream. Thus for example three spray angles $\alpha_{6.1} \neq \alpha_5 \neq \alpha_{6.2}$ may be selected of which two may indeed be equal, e.g. $\alpha_{6.1} = \alpha_{6.2}$. Experiments amongst other things have yielded the discovery that the penetration depth of the respective medium 5, 6.1, 6.2 into the gas flow is smaller the larger the spray angle $\alpha$ becomes. According to the application one would optimise the various parameters such as spray angle $\alpha_5$, $\alpha_{6.1}$, $\alpha_{6.2}$, the discharge velocity and/or the mass flows (cf. Table 1 further below) of the media 5, 6.1, 6.2 in a suitable way and manner in order to achieve an efficient interspersing of the gas flow 8 with fluid droplets 5.

FIG. 4 shows a preferred embodiment form of the injection nozzle 1 according to the invention in a perspective view. The same embodiment form is shown in FIG. 5 in a top view and in FIG. 6 in a longitudinal section. The injection nozzle 1 contains a nozzle head 2, a nozzle body 3 as well as a fluid connection union 41 and a gas connection union 43. The components are manufactured for example of metal, preferably of stainless steel.

The nozzle head 2 contains a fluid channel insert 21 and two gas channel inserts 23.1, 23.2 which are arranged essentially in a middle plane of the cylindrical injection nozzle 1. The injection nozzle 1 is preferably installed such that the base surface 20 of the nozzle head 2 is flush with the inner wall of a duct bordering the gas flow 8 to be interspersed.

The fluid channel insert 21 opens into a slot-like fluid orifice 22 with a length of 1.4 mm and a width of approx. 0.4 mm. The fluid orifice 22 lies essentially centrally on a longitudinal axis 10 of the injection nozzle, wherein in the embodiment example discussed here it may be distanced from the longitudinal axis 10 by a length of approx. 1.5 mm which is small in relation to the nozzle diameter.

In the fluid discharge zone close to the fluid orifice 22 there arises a pressure drop and as a result of this a suction effect. By way of this, swirling is produced in the gas flow 8 which could deform or destabilise the flat fluid spray and change the size distribution of the fluid droplets 5. In order to avoid this effect or however to reduce it, the fluid channel insert 21 for example protrude for example by approx. 2 to 9 mm and preferably by approx. 3 to 5 mm beyond the base surface 20 of the nozzle head 2 into the gas flow 8. This protuberance of the fluid channel insert 21 stabilises and controls the spray angle $\alpha$ as well as the size distribution and the trajectories of the fluid droplets.

For an efficient reduction of the swirling effect the fluid orifice 22 should be arranged higher above the base surface 20 than the gas orifice 24.1, 24.2. It is particularly advantageous if the ratio of the height differences with respect to the base surface 20 between the fluid orifice 22 and each gas orifice 24.1, 24.2 on the one hand and the greatest distance in the base surface 20 between the two (fluid or gas) orifices 24.1, 24.2 laying furthest apart from one another on the other hand is between 0.08 and 0.40 and preferably between 0.12 and 0.20.

The gas channel inserts 23.1, 23.2 in each case open into a slot-like gas orifice 24.1, 24.2 with a length of approx. 2.1 mm and a width of approx 1.3 mm. The gas orifice 24.1 situated upstream lies approx. 15 mm from the fluid orifice 22. The associated gas channel insert 23.1 situated upstream is preferably slightly tilted with respect to the nozzle longitudinal axis 10 in a manner such that the discharged auxiliary gas 6.1 is directed slightly towards the gas flow 8 (i.e. its velocity has a component in the (−x)-direction) if the nozzle longitudinal axis 10 is perpendicular to the gas flow 8 (i.e., points in the z-direction). This, thus corresponds essentially to the embodiment form represented schematically in FIG. 1(*b*). The tilt angle $\beta$ is for example approx. 2° to 20°, preferably approx. 10°. By way of this the auxiliary gas 6.1 discharged from the gas orifice 24.1 situated upstream shields the fluid droplets 5 even more efficiently from the gas flow 8 and permits as far as possible penetration of the fluid droplets 5 into the gas flow 8.

The gas orifice 24.2 situated downstream lies approx. 10 mm distanced from the fluid orifice 22. This distance is thus preferably shorter than that between the gas orifice 24.1 situated upstream and the fluid orifice 22. Furthermore the associated gas channel insert 23.2 situated downstream is preferably parallel to the nozzle longitudinal axis 10. The injection nozzle 1 is thus asymmetrical with respect to the distance and direction of the gas channel inserts 23.1, 23.2. The main objective of the auxiliary gas 6.2 discharged from the gas orifice 24.2 situated downstream is an entraining and stabilising effect on the fluid droplets 5 which in turn results in as far as possible penetration of the fluid droplets 5 into the gas flow 8. The gas channel inserts 23.1, 23.2 lie essentially in the base surface 20 of the nozzle head 2.

The slot-like fluid or gas orifice 22, 24.1, 24.2 are arranged such that their longitudinal axes are parallel to one another and lie perpendicular to the gas flow 8 (i.e., parallel to the y-direction). They are designed in a manner such that the angles of the fluid or gas sprays are between approx. 20° and 90°, preferably approx. 60°.

The nozzle head 2 is fastened on the nozzle body 3 by way of two fastening screws 25.1, 25.2 which engage into corresponding shoulders or flanges 26, 36.

The nozzle body 3 comprises a fluid supply channel 31 with which the fluid 5 is led to the fluid channel insert 21, and a gas supply channel 33 with which the auxiliary gas 6 is led to the two gas channel inserts 23.1, 23.2.

A fluid connection union 41 and a gas connection union 43 are screwed into the nozzle body 3, and these unions comprise a fluid inlet opening 42 and a gas inlet opening 44 respectively.

As the embodiment example of FIG. 6 shows, with the design of the injection nozzle 1 one must particularly take into account the safety aspect. If components of the injection nozzle 1 were to detach during operation and were to fly with the air flow 8 into the compressor then this would lead to fatal damage of the compressor and turbine. In order to prevent this the endangered components such as the fluid channel insert 21 or the gas channel inserts 23.1, 23.2 were provided with an upwardly tapering shape or respectively shoulder-like reliefs. It was further taken care that nozzle parts such as the inserts 21, 23.1, 23.2 protrude as little as possible beyond the base surface 20, i.e. into the air stream 8. Protuberance on the nozzle may specifically cause undesired flow effects in the gas flow 8. They are not seldom used by maintenance personnel as climbing aids, by which means they may be damaged.

The injection nozzle 1 shown in the FIGS. 4–6 is designed for water as a fluid 5 and air as an auxiliary gas 6.1, 6.2. In order to intersperse an air flow 8 with a velocity at the injection location for example of 30–80 m/s and a mass flow for example of 500 $m^3/s$ with water droplets 5 the operating parameters specified in Table 1 are selected.

TABLE I

| Parameter | fluid 5 | auxiliary gas 6.1, 6.2 |
|---|---|---|
| Pressure (Pa) | $4 \cdot 10^5$ | $4 \cdot 10^5$ |
| Area of the orifice ($m^2$) | $4.4 \cdot 10^{-7}$ | $2 \times 2.1 \cdot 10^{-6}$ |
| Discharge velocity (m/s) | 28 | 317 |
| Mass flow ($m^3/s$) | $1.3 \cdot 10^{-5}$ | $2 \times 1.7 \cdot 10^{-3}$ |

As already mentioned further above, these and other operating parameters such as, e.g., spray angle $\alpha$ may be varied and optimised in order to achieve an efficient wetting and cleaning of the compressor blades.

In an experiment without gas flow with the injection nozzle of FIGS. 4–6 using the parameters for fluid and auxiliary gas specified in Table 1 at a distance of 200 mm from the nozzle base surface 20, water droplet diameters between approx. 50 and 250 μm diameter were measured. Under the same conditions, but without auxiliary gas the diameter was likewise between approx. 50 and 250 μm. This result shows that the distribution of the water droplet diameter is not changed by the auxiliary gas.

In a further experiment the injection nozzle of FIGS. 4–6 was held horizontally, wherein the longitudinal axis 10 of the nozzle was located at a height 1200 mm above the underlay. Fluid and auxiliary gas (if used) were discharged with a pressure of in each case $4 \cdot 10^5$ Pa. Without auxiliary gas a wetting on the underlay at distances from 800 to 2000 mm from the nozzle was observed whilst the throw (trajectory) range with auxiliary gas were between 800 and 4500 mm. The fluid droplets are thus transported considerably further with the auxiliary gas than without it.

Of course the invention is not limited to the embodiment form discussed above and represented in the drawings. With the knowledge of the invention the man skilled in the art would develop further embodiment forms. Thus e.g. the slot-like fluid orifice 22 shown in the FIGS. 4–6 may be replaced by several, for example circular fluid orifices with a small diameter which are arranged on a straight line lying parallel to the y-direction. The entirety of the fluid droplets exiting these fluid orifices likewise defines a fluid injection plane. The same also applies to the gas orifice 24.1, 24.2. The tilting of the gas channel insert 23.1 located upstream, with respect to the longitudinal axis of the nozzle as well as the asymmetrical arrangement of the gas orifices 24.1, 24.2 with respect to the fluid orifice 22 is facultative, if also advantageous.

Furthermore the fluid injection plane 50 does not need to be perpendicular to the gas flow 8. Rather any angles of incidence angles, preferably 15° and 165° with respect to the gas flow 8 are possible. This may for example be realised by the mounting of the nozzle according to the invention in a ball joint, analogously to the nozzle mounting which is described in the initially discussed U.S. Pat. No. 5,193,976.

For illustrating the comprehensiveness of the variants of the invention FIG. 7 in schematic plan views shows four embodiment forms of the injection nozzles according to the invention. The nozzle head 2, analogously to FIG. 5 is shown as a circular disk, but may of course also have other shapes. The gas flow 8 to be interspersed is also drawn in each case. FIG. 7 is to emphasise that various arrangements of the fluid orifices 22, 22.1, 22.2 and gas orifices 24, 24.1–24.6 are possible. The embodiment according to FIG. 7(*a*) has a central fluid orifice 22 and in each case a gas orifice 24.1 and 24.2 located upstream and downstream respectively. The orifices 22, 24.1 and 24.2 are arranged next to one another in the flow direction and in each case have a slot-like shape, wherein their longitudinal axes are parallel to one another and are perpendicular to the flow direction. Their arrangement reminds one of the Roman numeral III. This embodiment form thus corresponds essentially to that of FIG. 5. In the embodiment form of FIG. 7(*b*) the slot-like fluid orifice 22 is likewise arranged between two slot-like gas orifices 24.1, 24.2, but its longitudinal axis is parallel to the flow direction and perpendicular to the longitudinal axes of the gas orifices 24.1, 24.2. The arrangement reminds one of the capital letter H. In the embodiment form of FIG. 7(*c*) a central, circular disk shaped fluid orifice 22 is surrounded by a concentric annular gas orifice 24. FIG. 7(*d*) shows an embodiment form with two fluid orifices 22.1, 22.2 and in each case three gas orifices 24.1–24.6 arranged on both sides thereof. With the knowledge of the invention the man skilled in the art would be in the position of developing further arrangements of fluid orifices and gas orifices which are optimally adapted to the respective application.

Finally in FIG. 8 there is shown a gas turbine compressor 9 according to the invention in a schematic longitudinal section through the intake part. The intake part comprises an air intake duct 91 comprising a housing wall 92. Furthermore a part of the compressor blading 93 to be cleaned is represented. In the housing wall 92 there is mounted at least one injection nozzle 1.1–1.4. The injection nozzle comprises a fluid inlet opening 42 and at least one fluid orifice 22 connected to the fluid inlet opening 42, and further a gas inlet opening 44 and at least one gas orifice 24.1, 24.2 connected to the gas inlet opening 44. The injection nozzle is preferably designed according to the embodiment example of FIGS. 4–6.

The embodiment form represented in FIG. 8 is a simple schematic example. One may provide more injection nozzles and these may be distributed at various locations of the housing walling 92, particularly also around the circumference. The invention is not limited to gas turbine compressors, but also for the application in flow ducts of other flow machines.

| Legend to the figures: | |
|---|---|
| 1. | Injection nozzle |
| 10. | Longitudinal axis |
| 2 | Nozzle head |
| 20 | Base surface |
| 21 | Fluid channel insert |
| 22, 22.1, 22.3 | Fluid orifice |
| 23.1, 23.2 | Gas channel inserts |
| 24, 24.1–24.6 | Gas orifice |
| 25.1, 25.2 | Fastening screws |
| 26 | Shoulder |
| 3 | Nozzle body |
| 31 | Fluid supply channel |
| 33 | gas supply channel |
| 36 | Shoulder |
| 41 | Fluid connection union |
| 42 | Fluid inlet opening |
| 43 | Gas connection union |
| 44 | Gas inlet opening |
| 5 | Fluid droplets |
| 50 | Fluid injection plane |
| 6.1, 6.2 | Auxiliary gas |
| 60.1, 60.2 | Gas injection plane |
| 7 | Mixing zone |
| 8 | Gas flow |
| 9 | Gas turbine compressor |
| 91 | Air intake duct |
| 92 | Housing walling |
| 93 | Compressor blading |
| x, y, z | Cartesian coordinate |
| α | Spray angle of the fluid droplet fan, respectively gas fans |
| β | Tilting angle of an injection plane |

The invention claimed is:

1. A method for interspersing a gas flow with fluid droplets, wherein the fluid droplets are injected into the gas flow having a boundary layer, characterized in that an auxiliary gas is injected simultaneously with the fluid droplets into the gas flow, wherein the injection speed of the auxiliary gas is larger than the injection speed of the fluid droplets, so that the injected auxiliary gas entrains and accelerates the injected fluid droplets into the gas flow, stabilizes the injected fluid droplets with respect to its trajectory and size, and partly shields the injected fluid droplets from the gas flow in order to enable a penetration of the gas flow boundary layer by the injected fluid droplets.

2. The method according to claim 1, wherein the discharge velocity of the auxiliary gas is at least twice as large than the discharge velocity of the fluid droplets.

3. The method according to claim 2, wherein the fluid droplets are injected into the gas flow essentially in a fluid injection plane and an auxiliary gas is injected into the gas flow simultaneously with the fluid droplets, wherein the auxiliary gas is injected into the gas flow essentially in a gas injection plane.

4. The method according to claim 2, wherein the discharge velocity of the auxiliary gas is at least five times larger than the discharge velocity of the fluid droplets.

5. The method according to claim 2, wherein the discharge velocity of the auxiliary gas is at least ten times larger than the discharge velocity of the fluid droplets.

6. The method according to claim 1, wherein the fluid droplets are injected into the gas flow essentially in a fluid injection plane and an auxiliary gas is injected into the gas flow simultaneously with the fluid droplets, wherein the auxiliary gas is injected into the gas flow essentially in a gas injection plane.

7. The method according to claim 6, wherein the fluid injection plane is essentially perpendicular to the flow direction (x) of the gas flow.

8. The method according to claim 7, wherein the gas injection plane lies essentially parallel to the fluid injection plane and is distanced to this.

9. The method according to claim 7, wherein the gas injection plane is slightly tilted with respect to the fluid injection plane in a manner such that the speed component in the direction (x) of the gas flow with the auxiliary gas is smaller than with the fluid droplets, and the tilting angle (β) is 2° to about 20°.

10. The method according to claim 9, wherein:

on both sides of the fluid injection plane in each case an auxiliary gas is injected into the gas flow in a first and second gas injection plane respectively, said first and second gas injection plane lying essentially parallel to the fluid injection plane and being distanced to this;

the distance between the gas injection plane located upstream and the fluid injection plane is selected larger than the distance between the gas injection plane situated downstream and the fluid injection plane;

the fluid droplets and the auxiliary gas are injected into the gas flow in the form of fans, wherein the spray angle (α) of the fans is between about 20° and about 90°;

the fluid droplets and the auxiliary gas are discharged from slot-like orifices which are arranged next to one another and whose longitudinal axes are preferably parallel to one another.

11. The method according to claim 10, wherein the gas flow is an intake air flow of a gas turbine compressor, the method further comprising interspersing the intake air flow with droplets of a cleaning fluid.

12. The method according to claim 10, wherein the spray angle (α) of the fans is about 60°.

13. The method according to claim 9, wherein the gas injection plane is slightly tilted with respect to the fluid injection plane in a manner such that the speed component in the direction (x) of the gas flow with the auxiliary gas is smaller than with the fluid droplets, and the tilting angle (β) is about 10°.

14. The method according to claim 6, wherein the gas injection plane lies essentially parallel to the fluid injection plane and is distanced to this.

15. The method according to claim 6, wherein the gas injection plane is slightly tilted with respect to the fluid injection plane in a manner such that the speed component in the direction (x) of the gas flow with the auxiliary gas is smaller than with the fluid droplets, and the tilting angle (β) is about 2° to about 20°.

16. The method according to claim 15, wherein:

on both sides of the fluid injection plane in each case an auxiliary gas is injected into the gas flow in a first and second gas injection plane respectively, said first and second gas injection plane lying essentially parallel to the fluid injection plane and being distanced to this;

the distance between the gas injection plane located upstream and the fluid injection plane is selected larger than the distance between the gas injection plane situated downstream and the fluid injection plane;

the fluid droplets and the auxiliary gas are injected into the gas flow in the form of fans, wherein the spray angle (α) of the fans is between about 20° and about 90°;

the fluid droplets and the auxiliary gas are discharged from slot-like orifices which are arranged next to one another and whose longitudinal axes are preferably parallel to one another.

17. The method according to claim 16, wherein the gas flow is an intake air flow of a gas turbine compressor, the method further comprising interspersing the intake air flow with droplets of a cleaning fluid.

18. The method according to claim 16, wherein the spray angle (α) of the fans is about 60°.

19. The method according to claim 15, wherein the gas injection plane is slightly tilted with respect to the fluid injection plane in a manner such that the speed component in the direction (x) of the gas flow with the auxiliary gas is smaller than with the fluid droplets, and the tilting angle (β) is about 10°.

20. The method according to claim 6, wherein on both sides of the fluid injection plane in each case an auxiliary gas is injected into the gas flow in a first and second gas injection plane respectively, said first and second gas injection plane lying essentially parallel to the fluid injection plane and being distanced to this.

21. The method according to claim 20, wherein the distance between the gas injection plane located upstream and the fluid injection plane is selected larger than the distance between the gas injection plane situated downstream and the fluid injection plane.

22. The method according to claim 1, wherein the fluid droplets and the auxiliary gas are injected into the gas flow in the form of fans, wherein the spray angle (α) of the fans is between about 20° and about 90°.

23. The method according to claim 22, wherein the fluid droplets and the auxiliary gas are injected into the gas flow in the form of fans, wherein the spray angle (α) of the fans is about 60°.

24. The method according to claim 1, wherein the fluid droplets and the auxiliary gas are discharged from slot-like orifices which are arranged next to one another and whose longitudinal axes are preferably parallel to one another.

25. The method according to claim 1, wherein the gas is an intake air flow of a gas turbine compressor, the method further comprising interspersing the intake air flow with droplets of a cleaning fluid.

26. A method for wet-cleaning a gas turbine compressor which comprises an air intake duct through which intake air flows, wherein a cleaning fluid in the form of fluid droplets is injected into the air intake duct and into the intake air flow having a boundary layer, and the fluid droplets are transported by the intake air to the parts of the gas turbine compressor to be cleaned, in order to clean these, characterized in that an auxiliary gas is injected into the intake air flow simultaneously with the fluid droplets, wherein the injection speed of the auxiliary gas is larger than the injection speed of the fluid droplets, so that the injected auxiliary gas entrains and accelerates the injected fluid droplets into the air intake flow, stabilizes the injected fluid droplets with respect to its trajectory and size, and partly shields the injected fluid droplets from the air intake flow in order to enable a penetration of the air intake flow boundary layer by the injected fluid droplets.

* * * * *

UNITED STATES PATENT AND TRADEMARK OFFICE

CERTIFICATE OF CORRECTION

PATENT NO. : 7,114,910 B2
APPLICATION NO. : 10/490262
DATED : October 3, 2006
INVENTOR(S) : Jean-Pierre Stalder It is certified that error appears in the above-identified patent and that said Letters Patent is hereby corrected as shown below:

Column 6, line 56, "angle a" should read --angle $\alpha$--.

Signed and Sealed this

Seventh Day of August, 2007

JON W. DUDAS
*Director of the United States Patent and Trademark Office*